Oct. 17, 1950     L. C. HUCK     2,526,235
BLIND RIVET

Original Filed Aug. 10, 1942     2 Sheets-Sheet 1

INVENTOR
Louis C. Huck.
BY Harness Dickey & Pierce
ATTORNEYS

Oct. 17, 1950     L. C. HUCK     2,526,235
BLIND RIVET
Original Filed Aug. 10, 1942     2 Sheets-Sheet 2
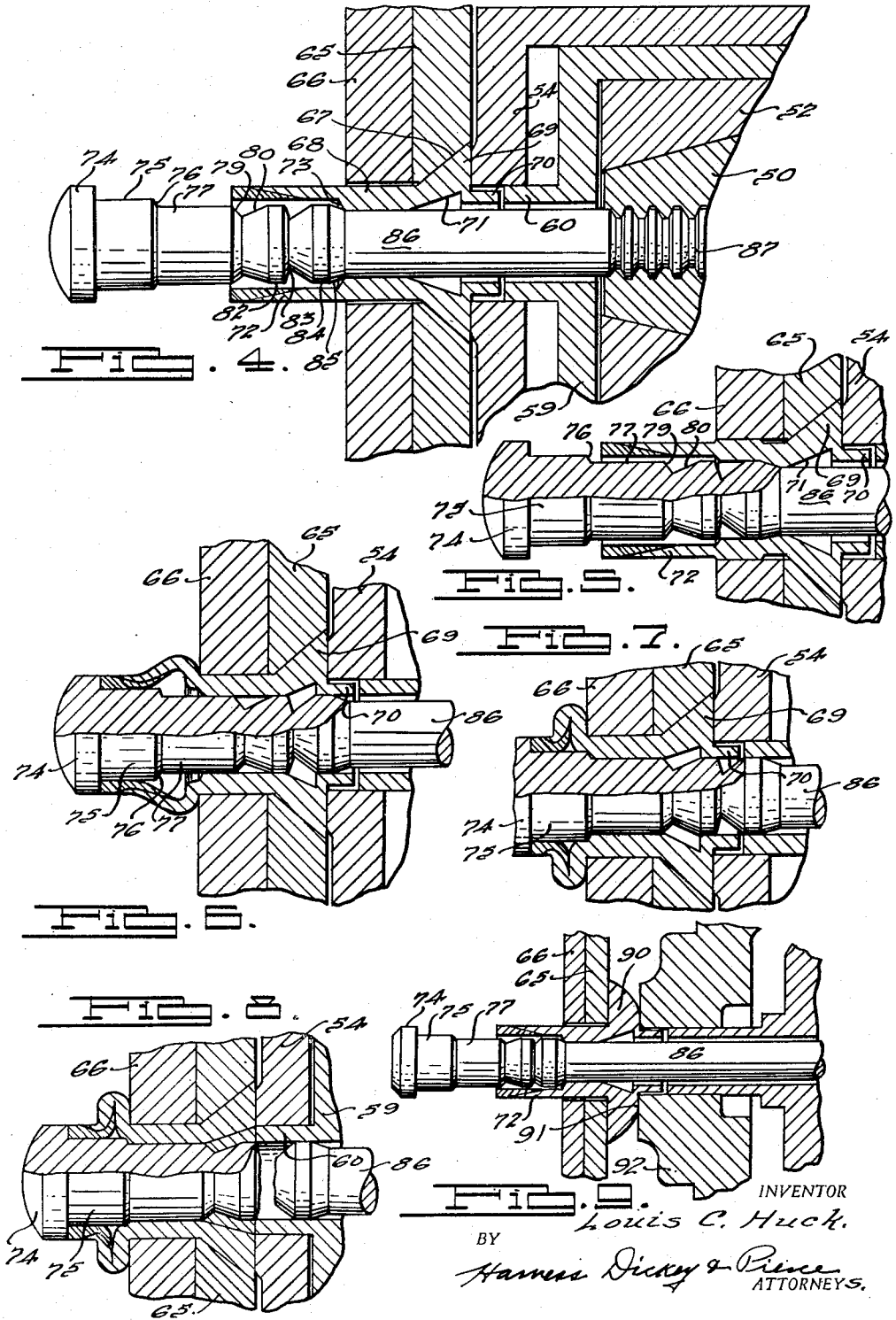
INVENTOR
Louis C. Huck.
BY
Harness Dickey & Pierce
ATTORNEYS.

Patented Oct. 17, 1950

2,526,235

UNITED STATES PATENT OFFICE 2,526,235

BLIND RIVET

Louis C. Huck, Detroit Mich., assignor, by mesne assignments, to Huck Manufacturing Company, Detroit, Mich., a corporation of Michigan Original application August 10, 1942, Serial No. 454,211, now Patent No. 2,397,111, dated March 26, 1946. Divided and this application November 20, 1944, Serial No. 564,316

3 Claims. (Cl. 85—40)

The invention relates to rivets and riveting and it has particular relation to rivets adapted to be applied and set from one side only of the structure being riveted.

The present application constitutes a division of my copending application for patent, Serial No. 454,211, filed August 10, 1942, now Patent 2,397,111, issued March 26, 1946, and entitled Rivet and Method of Riveting.

One object of the invention is to provide an improved two-part rivet including a pin and a tubular member wherein means are provided for limiting motion of the pin through the tubular member.

Another object of the invention is to provide an improved method of riveting with a two-part rivet such as mentioned, wherein an improved lock between the pin and tubular member is effected through governing of the pin forces and pin motion.

Another object of the invention is to provide an improved method of riveting with a two-part rivet wherein, through governing of pin forces and pin motion, a tighter relation of parts is obtained.

Other objects of the invention will become apparent from the following specification, from the drawings relating thereto, and from the claims hereinafter set forth.

For a better understanding of the invention, reference may be had to the drawings, wherein.

Figs. 4, 5, 6, 7 and 8 relate to another form of the invention and illustrate different stages in the rivet setting operation; and, Fig. 9 illustrates a rivet on the order of that shown by Fig. 4, but constructed according to another form of the invention.

Figure 1:
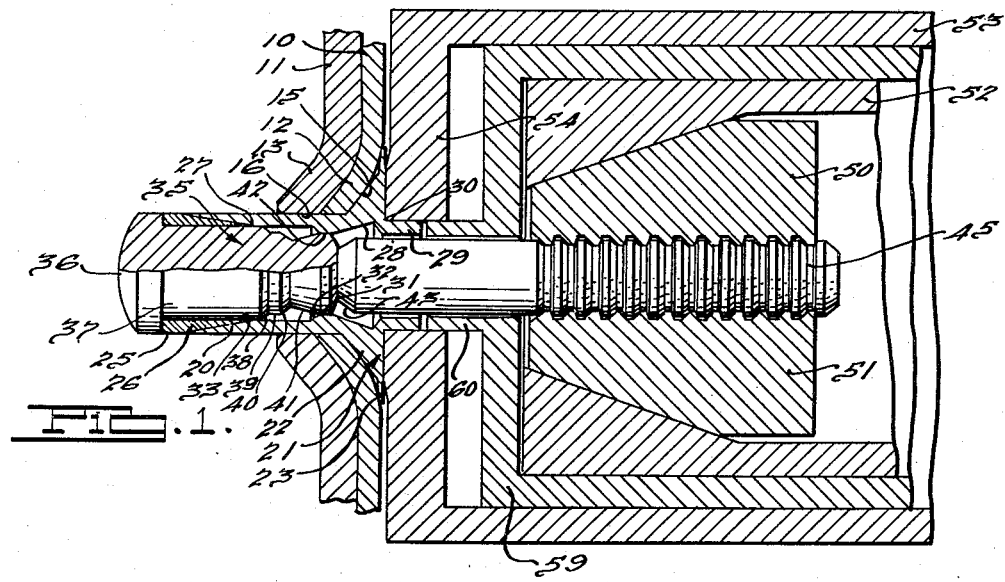
Figure 1 is a cross-sectional view of a rivet assembly constructed according to one form of the invention, with rivet setting apparatus engaging the rivet preparatory to setting it.

Referring to Fig. 1, structural sheets or strips to be riveted are indicated at 10 and 11 and these have apertured dimples 12 and 13 which provide a conical recess 15 adapted to receive a conically formed rivet head and an opening 16 for receiving the body portion of the rivet. The method of forming the dimple and the details characterizing the dimple formation are disclosed in my copending applications for patent Serial No. 327,138, filed April 1, 1940, now Patent 2,292,466, issued August 11, 1942, and Serial No. 352,205, filed August 12, 1940, now Patent 2,302,772, issued November 24, 1942. Mechanisms particularly adapted for forming the dimples are disclosed and claimed in the aforesaid and in my copending application for patent Serial No. 352,204, filed August 12, 1940, now Patent 2,431,935, issued December 2, 1947. In certain respects too, the rivets disclosed in the present application for patent are similar to structures shown and disclosed in Patents 2,292,446 and 2,302,772.

Still referring to Fig. 1, the rivet comprises a tubular member 20 having a frusto-conical head 21 adapted substantially to fit the recess 15 in the sheet 10. The external formation of this head corresponds substantially to the external formation of the head in the rivet disclosed in Patent 2,302,772 above identified, and, briefly, the head includes a conical formation 22 accurately fitting the conical surface 15, and an outer fairing or thin edge projection 23 which substantially contacts the sheet 10 towards the outer edge of the dimpled area. The particular advantages and structural characteristics of the two parts of the head and the manner in which the dimple recess is formed and how it cooperates with the two parts of the head are brought out in detail in Patent 2,302,772. While the rivet shown in such copending application for patent is of one-piece character, whereas in the present case, the rivet is of two pieces, it should be understood that the head formation described and the manner in which it cooperates with the dimple recess may be the same regardless of whether the rivet is of one-piece or two-piece character.

Beyond the inner end of the dimple portion in sheet 11, the tubular member projects substantially so as to provide an annular wall which may be expanded into a head at the inner side of the structure. This wall is strain hardened by cold working from approximately the point 27 to the outer end of the wall and the strain hardening progressively increases as diagrammatically indicated by the tapered area 26, towards such end, so as to progressively increase the resistance of the wall to expansion. At the extreme outer end, the strain hardening may be further increased so as to provide an annular section 25 which is more resistant to expansion and which acts on the order of a harder ring for restraining expansion at the end of the wall. It will be understood that the strain hardening from the outer end to the point 27 extends radially through the entire wall thickness and that the shaded tapering area 27 is only diagrammatically illustrative of the progressive strain-hardening which decreases axially from the section 25 to the point 27.

At the other end of the tubular member, the head 21 has an inner recess 28 of conical character and at the larger end of this recess, a tubular projection 29 or collar is joined to the head by a narrow wall 30. At the smaller end of the recess 28, a short cylindrical surface 31 is provided and beyond this, a tapered shoulder 32 is provided which extends outwardly to a remaining, cylindrical inner surface 33 slightly larger in diameter.

A second part of the rivet comprises a pin 35 having a head 36 engaging the strain-hardened end 25 of the tubular member and the outer diameter of the head is not larger than the body part of the tubular member so that the pin and tubular member may, as an assembly, be inserted through the rivet opening 16. To the right of the head 36, the pin has a body portion 37 closely fitting the surface 33 in the body portion of the tubular member and preferably a slight press fit is obtained so as to firmly hold the parts assembled. Beyond the portion 37, the pin has an annular, inwardly tapered shoulder 38 substantially corresponding in dimensions to the shoulder 32 in the tubular member and this shoulder 38 joins a short cylindrical surface 39 adapted substantially to fit within the surface 31 of the tubular member when the rivet is set. A wide angle shaped groove is provided in the pin beyond the surface 39 and is defined by side surfaces 40 and 41, respectively. At its right end, tapered surface 41 joins a short cylindrical surface 42 substantially fitting the surface 31 on the tubular member as the parts are initially assembled, and outwardly of this surface a break neck or groove 43 is formed. The latter is deeper or rather it has the smallest trough diameter on the pin so that the pin may be broken at this point easier than at other points. Outwardly, of this groove, a substantial length of pin is provided which terminates in gripping grooves 45.

The pin comprises metal of greater hardness and tensile strength as compared to the tubular member and in connection with aircraft riveting in particular, the parts, respectively, may be made from aluminum alloys having different degrees of hardness.

The rivet is adapted to be set by mechanism which includes jaws 50 and 51 engageable with the grooved portion 45 of the pin and these jaws are adapted to be moved by a jaw-actuating member 52. When the jaw-actuating member 52 is pulled towards the right so as to apply tension to the pin, the reactionary force first is applied through a sleeve 53 and anvil 54 to the outer face of the head 21 of the rivet. When the parts are assembled as seen in Fig. 1, sufficient tension on the pin first will cause the head 36 to apply axial forces to the end 25 of the tubular member and when these forces are sufficient, the tubular projection will bulb into an annular head, as indicated at 55 in Fig. 2.

Formation of this head is controlled by the strain-hardened section 26 and this section is so designed that the bulbing will begin close to or against the work or end of the dimple 13 in sheet 11. Moreover, the structure is such that through substantial variation in sheet thickness this desired manner of bulbing will occur. Changes in sheet thickness will, with a single length tubular member, cause the projecting tubular part to vary in length and in the designed range, the length of tubular part and thickness thereof, in conjunction with the progressive strain-hardened end, will insure beginning of bulbing action close to the work and completion of bulb forming with the bulb strongly against the work. A part of the progressively strain-hardened section may also expand depending upon work thickness, but generally the cold-worked section 25 will remain against the pin. It may be mentioned here that the progressive strain-hardening, if desired, may extend from the point 27 all the way to the outer end of the tubular member so as to avoid any distinctive end section 25 and, in this event, a substantial end section of the strain-hardened section will remain against the pin, although it may be less in length.

Figure 2:
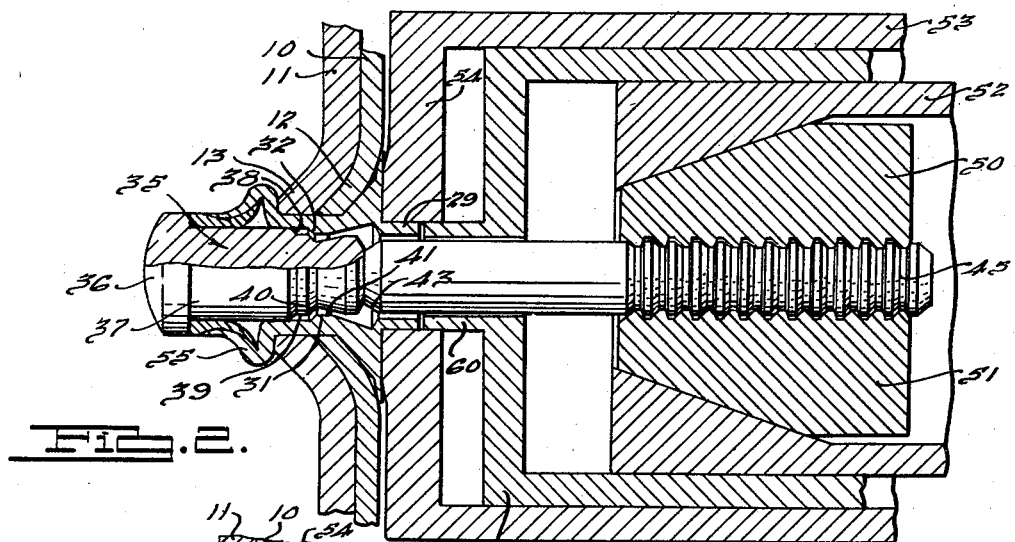
Fig. 2 illustrates the assembly shown by Fig. 1 after the rivet has partly been set.
Figure 3:
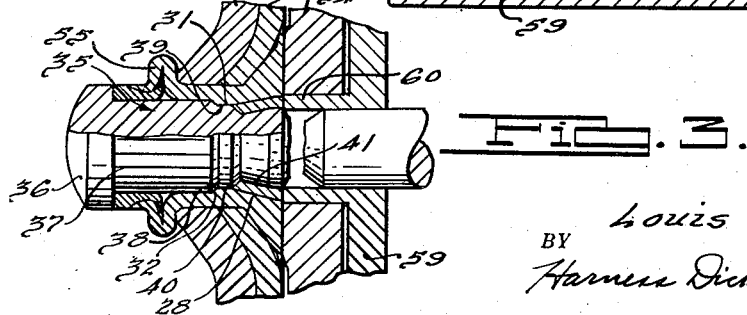
Fig. 3 is a view illustrating the rivet as finally set.

Fig. 2 shows the beginning of the bulbing action. As it continues, the shoulder 38 on the pin approaches the shoulder 32 in the tubular member and finally, after the bulbed head is formed, the shoulders engage as seen in Fig. 3, so that further movement of the pin is stopped. At the same time, the cylindrical surface 39 on the pin has moved within the cylindrical surface 31 while the pin surfaces 40 and 41 have moved to positions complemental to the surface 28 in the tubular member so that these three surfaces form a conically shaped recess.

With the shoulders 38 and 32 now engaged and bulbed head formed, further movement of the pin is resisted both by the bulbed head and shoulder 32, and when the pull on the pin increases sufficiently, the riveting mechanism automatically operates to cause a secondary anvil 59 to move into engagement with the collar 29 so as to take the reaction previously taken by the anvil 54. This anvil has a tubular portion 60 which engages the collar 29 and when the reaction to the pull on the pin is taken by the anvil 59 and portion 60, the collar 29 is sheared from the head and moves into the recess in the head along the surface 28. The latter surface guides the collar into the space defined by the surface 28 and the pin surfaces 40 and 41, and, as a result, a positive annular lock of conical keystone character is formed between the pin and tubular member at this end of the rivet. It will be noted that the anvil 60 is free to move to the left so as to insure complete movement and upsetting of the metal 29 into the locking space whereby locking engagement is fully obtained. Normally, when this occurs, the anvil portion is substantially flush with the head 22.

Setting of the rivet may be effected by riveting mechanism on the order of that embodied in Huck et al. Patent No. 2,053,719 and illustrated particularly in Fig. 9 of that patent. Operation of the mechanism is controlled by a manually actuated trigger. The primary anvil first takes the reaction to pull on the pin and then, when the pull on the pin reaches a predetermined value after forming the bulbed head, the secondary anvil functions automatically and moves against the collar so that the reaction to the pull on the pin is taken through the latter. Reduction in pull on the pin may occur as the collar shears off and moves into the locking recess but as the collar seats in the latter the secondary anvil meets greater resistance to movement and the pull on the pin and reaction force on the anvil increase so that the locking metal or collar is strongly forced and upset into the locking recess.

In general, it should be understood by having the progressively cold-worked end of the tubular member and controlling its formation, that forming of the bulbed head against the work or structure riveted can be assured even with substantial variation of work or grip thickness and a definitely fixed amount of pin motion. In other words, within a range of substantial variation in length of tubular member projecting beyond the dimple 13 in sheet 11, the progressive cold working is controlled so that the bulb begins to form close to the work so as to assure positive engagement of the head with the work when the shoulders 38 and 32 engage each other.

Under certain conditions or in certain cases, it may be undesirable, after the secondary anvil 60 has acted to move the locking metal into the locking space, to increase the pull or tension on the pin higher than the pull which caused the secondary anvil automatically to operate. For this reason, it may be desirable in certain cases to break the pin at the breakneck or groove by bending the pin as by angling the riveting gun laterally instead of breaking the pin through pull or tension. When so bent, the pin may be easily broken off with the end of the remaining pin portion substantially flush with the head 22. With the rivet as then set, external surfaces of the pin fit internal surfaces of the tubular member so as in effect to obtain a solid, tight rivet.

Where the pin is broken off by lateral bending after action of the secondary anvil 60, this is preferably done after releasing all pull on the pin through releasing the trigger on the mechanism so as to thereby avoid recoil force when the pin breaks. Tension or pull on the pin energizes it and if the pin breaks suddenly while under tension, recoil forces corresponding to the pull tend to move the pin reversely or axially in the tubular member.

In other cases where lateral angling of the mechanism to break the pin is not desirable as, for instance, where the sheets 10 and 11 are particularly thin, the pin may be broken through pull or tension by allowing the pull to increase sufficiently after the anvil 60 has operated. Normally, a satisfactorily set and locked rivet may be obtained where the pin is broken through tension, but in certain cases as already indicated it may be desirable to set the rivet and break the pin through lateral bending, as described.

It has been brought out also in my prior Patent No. 2,061,628 that locking of the pin and tubular member by upsetting metal into the pin recess by means of the secondary anvil, avoids axial motion of the pin in the tubular member thus retaining the pressure of the pin head against the bulbed head.

The rivet construction shown by Figs. 4, 5, 6, 7, and 8 in many respects is similar to that already described but is more particularly adapted for riveting plates 65 and 66 wherein a machine countersunk opening 67, as differentiated from a dimpled opening, is provided. In this case, it is more desirable to fill the hole in the plates being riveted so as to eliminate all clearances between the tubular member and the side wall of the hole since the rivet takes shear loads in this case, whereas in the dimpled structure, the dimple takes the shear load. In order to accomplish this, the tubular member is provided with a wall portion 68 of smaller internal diameter which is adapted to lie within the opening in the plates. Outwardly of the portion 68, the tubular member has a head 69 provided with a tubular locking portion 70 and inner inclined surface 71 forming part of a locking recess as previously described.

Beyond the plate 66, a tubular extension 72 of larger internal diameter is provided and this extension at its inner end has a stop shoulder 73. At its outer end, the metal is strain-hardened as previously described.

The pin has a head 74 for engaging the end of the tubular member and beyond the head, a first portion 75 is provided which is substantially equal in diameter to the tubular extension. A tapered shoulder 76 is formed at the outer end of the pin portion 75 and this shoulder leads to a smaller pin portion 77. At the outer end of the latter, surfaces 79 and 80 form a locking groove in the pin for receiving the locking metal 70. Outwardly of the surface 80, a short cylindrical surface 82 is provided and the outer end of that surface joins a breakneck or groove 83. This groove outwardly joins a cylindrical surface 84 and beyond the latter an expanding shoulder 85 is provided which is adapted to expand portion 68 of the tubular member. The shoulder 85 joins an outer, cylindrical pin section having a slight press fit with portion 68 of the tubular member so as to hold the parts initially assembled. At the outer end of portion 86, grooves 87 are provided which are adapted to be gripped by the jaws of the riveting mechanism.

When the riveting mechanism is actuated, the first thing to occur is expansion of portion 68 of the tubular member by the shoulder 85 to fill the rivet hole as shown in Fig. 5. It will be noted, however, that since the shoulder 85 and cylindrical surface 84 are not as large in diameter as the portion 72, a part of shoulder 73 still remains following the expanding of portion 68. Following the hole filling operation, the head 74 engages the outer end of the tubular portion 72 and formation of the bulb occurs as seen in Fig. 6. After the bulbed head is formed, the shoulder 76 on the pin engages the shoulder 73 in the tubular member and pin motion is stopped with the parts related as shown in Fig. 7. The grooves on the pin and tubular member which form the recess for the locking metal are now in matching or complemental positions as also seen in Fig. 7. After this occurs, action of the secondary anvil causes the extension 70 to be moved into the locking recess and then the pin is broken as previously described. In the rivet as now set, the external surfaces of the pin have a close and sealing fit with respective inner surfaces of the tubular member so as in effect to obtain a solid, tight rivet.

The rivet shown by Fig. 9 is on the same order as that shown by Fig. 4, but instead of fitting a countersunk hole, it is provided with a brazier head 90 having a flat surface 91 around the collar 29. The rivet is set in the same way as described in connection with Figs. 4 to 8, with a primary anvil 92 engaging the flat surface 91. Where the pin is broken off by lateral bending, this flat surface facilitates the operation of angling the mechanism.

While it has been stated that, in certain cases, the pin will be broken off after the locking metal has been moved into the locking recess and after tension on the pin is released, it should be understood too that the pin can be broken off by increased tension after the lock is effected. In certain instances where this increased tension is undesirable, the pin may be broken off by lateral bending forces whereas in other cases where increased pin tension is not objectional, the pin can be broken off by a continued pull on the pin after the lock is effected.

Although more than one form of the invention has been illustrated and described in detail, it will be apparent to those skilled in the art that various modifications may be made without departing from the scope of the appended claims.

What is claimed is:

1. A rivet comprising a tubular body means adapted to project through the opening in a structure to be riveted and having a tubular portion adapted to project beyond one side of the structure and to be expanded into a head, a pin extending through the tubular body and having means on one end for expanding the tubular portion to form said head when the pin is moved axially in the body, said pin and body having locking means so constructed and arranged with respect to each other as to reach matching positions after formation of said head and after predetermined movement of the pin in the body, and shoulders on the pin and on the inner surface of the tubular body so constructed and arranged with respect to each other as to engage each other after said predetermined movement so as to prevent further movement of the pin in the body.

2. A rivet comprising a tubular body means adapted to project through the opening in a structure to be riveted and having a tubular portion adapted to project beyond one side of the structure and to be expanded into a head, a pin extending through the tubular body and having means on one end for expanding the tubular portion to form said head when the pin is moved axially in the body in one direction, a shoulder on the pin positioned to expand that part of the body within the structure opening during such movement of the pin, and a second shoulder on the pin of greater diameter than the first shoulder and positioned to limit movement of the latter in the tubular body in said direction.

3. A rivet comprising a tubular body means having a part adapted to project through the opening in a structure to be riveted and a second part of larger internal diameter than said first part adapted to be located beyond one side of the structure and to be expanded into a head, an annular internal shoulder at the junction of the two parts, a pin extending through the tubular member and having means on one end for expanding the second part of the body, a shoulder on the pin positioned to expand the first part of the tubular body to fill the structure opening, said shoulder being of such diametrical size that the internal diameter of said first part of the tubular body, while being increased, remains smaller than the internal diameter of the second part of the body after the hole filling operation, whereby a portion of the internal shoulder at the junction of the two parts of the body remains, and a second shoulder on the pin of greater diameter than said first shoulder and positioned to engage said remaining shoulder portion in the body after the head forming and hole filling operations so as to limit the pin movement.

LOUIS C. HUCK.

REFERENCES CITED

The following references are of record in the file of this patent:

UNITED STATES PATENTS

| Number | Name | Date |
| --- | --- | --- |
| 1,944,246 | Langhammer | Jan. 23, 1934 |
| 2,061,628 | Huck | Nov. 24, 1936 |
| 2,061,629 | Huck | Nov. 24, 1936 |
| 2,324,142 | Eklund | July 13, 1943 |
| 2,380,836 | Gottlieb | July 31, 1945 |